United States Patent
Lin et al.

(10) Patent No.: US 8,410,834 B2
(45) Date of Patent: Apr. 2, 2013

(54) ALL DIGITAL SERIAL LINK RECEIVER WITH LOW JITTER CLOCK REGENERATION AND METHOD THEREOF

(75) Inventors: Chia-Liang Lin, Fremont, CA (US); Gerchih Chou, San Jose, CA (US); Pei-Si Wu, Kaohsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 215 days.

(21) Appl. No.: 13/044,677

(22) Filed: Mar. 10, 2011

(65) Prior Publication Data
US 2012/0229184 A1    Sep. 13, 2012

(51) Int. Cl.
*H03L 7/00* (2006.01)
(52) U.S. Cl. .................. 327/146; 327/144; 327/114
(58) Field of Classification Search ................ 327/113, 327/114, 144–146
See application file for complete search history.

(56) References Cited

U.S. PATENT DOCUMENTS

| | | | | |
|---|---|---|---|---|
| 5,757,862 | A * | 5/1998 | Ishizu | 375/324 |
| 6,370,188 | B1 * | 4/2002 | Wu et al. | 375/222 |
| 6,693,862 | B1 * | 2/2004 | Shigemori | 369/47.31 |
| 7,848,394 | B2 * | 12/2010 | Clancy et al. | 375/219 |
| 2002/0146084 | A1 * | 10/2002 | Cranford et al. | 375/360 |
| 2009/0028252 | A1 * | 1/2009 | Lu | 375/260 |
| 2009/0045854 | A1 * | 2/2009 | Sidiropoulos | 327/144 |

* cited by examiner

*Primary Examiner* — Ryan Jager
(74) *Attorney, Agent, or Firm* — McClure, Qualey & Rodack, LLP

(57) ABSTRACT

An apparatus and method for clock regeneration with low jitter. The method includes the following steps: (a) using a phase lock loop to generate a first clock that is phase locked to a reference clock; (b) using a binary phase detector for generating a phase error signal by detecting a timing difference between the input signal and a second clock; (c) filtering the phase error signal to generate a first control word and a second control word; (d) performing a phase rotation on the first clock by an amount controlled by the first control word to generate the second clock; (e) filtering the second control word to generate a third control word; (f) sampling the third control word to generate a fourth control word using a third clock; and (g) performing a phase rotation on the first clock by an amount controlled by the fourth control word to generate the third clock. Comparable features for performing these steps are provided in the apparatus.

17 Claims, 3 Drawing Sheets

```
if RXD1==RXD
        PE =0;
else if EDG1==RXD1
        PE=1;
else
        PE=−1;
```

ALL DIGITAL SERIAL LINK RECEIVER WITH LOW JITTER CLOCK REGENERATION AND METHOD THEREOF

FIELD OF THE INVENTION

This disclosure relates generally to method and apparatus of serial link receiver and more particularly to a serial link receiver and method that realize low jitter clock regeneration.

DISCUSSION OF THE PRIOR ART

Serial links are used in many applications, including optical communications. As depicted in FIG. 1, a prior art serial sink 100 comprises a transmitter 110, a transmission medium 120, and a receiver 130. The transmitter 110 transmits onto a first end 121 of the transmission medium 120 a first signal 51 using a two-level signaling scheme to represent a first serial binary data stream D1 timed in accordance with a first clock CLK1. The first signal 51 traverses along the transmission medium 120 and evolves into a second signal S2 as it reaches a second end 122 of the transmission medium 120. The second signal S2 is received by the receiver 130 at the second end 122 of the transmission medium 120. The receiver comprising a CDR (clock data recovery) apparatus 131 for generating a second clock CLK2 by extracting certain timing embedded in the second signal S2, and for using the second clock CLK 2 to sample the second signal S2 to generate a second serial binary data stream D2. When the CDR apparatus 131 functions correctly, the second serial binary data stream D2 will substantially match the first serial binary D1, except for the inherent delay. The second clock CLK2 will also track the first clock CLK1 in timing, except for the inherent delay, in an average sense.

A practical clock data recovery apparatus is limited in bandwidth, however, and this results in a timing error in the second clock CLK2, wherein the timing error is embodied in a high frequency clock jitter that is beyond the bandwidth of the clock data recovery apparatus. To filter output the timing error in the second clock CLK2, receiver 130 further comprises a PLL (phase lock loop) 132 for receiving the second clock CLK2 and outputting a third cock CLK3. As is knows by persons skilled in the art, a PLL functions as a low pass filter for filtering high frequency clock jitters. As a result, the third clock CLK3 is generally a cleaner clock than the second clock CLK2.

While the prior art receiver 130 can effectively regenerate a low jitter clock, a PLL 132 is needed. As well known in prior art, a CDR apparatus 131 also comprises an oscillator (for generating the second clock CLK2), and PLL 132 comprises another oscillator (for generating the third clock CLK3). Therefore, two oscillators are used.

More efficient implementations of such functional circuitry are desired.

SUMMARY OF THE INVENTION

To overcome certain shortcomings of the prior art, embodiments of the present invention regenerate a low jitter clock using only one oscillator.

In certain embodiments, an apparatus comprises a phase lock loop for receiving a reference clock and outputting a first clock that is phase locked to the reference clock; a binary phase detector for receiving an input signal and a second clock and outputting a phase error signal by detecting a timing difference between the input signal and the second clock; a first filter for receiving the phase error signal and outputting a first control word and a second control word by filtering the phase error signal; a first phase rotator for generating the second clock by performing a phase rotation on the first clock by an amount controlled by the first control word; a second filter for receiving the second control word and outputting a third control word by low pass filtering the second control word; a resample circuit for sampling the third control word and outputting a fourth control word using a third clock; and a second phase rotator for generating the third clock by performing a phase rotation on the first clock by an amount controlled by the fourth control word. In a further embodiment, the first phase rotator comprises a phase selection circuit for selecting a phase among a plurality of phases of the first clock in accordance with the first control word. In a further embodiment, the second phase rotator comprises a phase selection circuit for selecting a phase among a plurality of phases of the first clock in accordance with the fourth control word.

In certain embodiments, a method comprises the following steps: (a) using a phase lock loop to generate a first clock that is phase locked to a reference clock; (b) using a binary phase detector for generating a phase error signal by detecting a timing difference between the input signal and a second clock; (c) filtering the phase error signal to generate a first control word and a second control word; (d) performing a phase rotation on the first clock by an amount controlled by the first control word to generate the second clock; (e) filtering the second control word to generate a third control word; (f) sampling the third control word to generate a fourth control word using a third clock; and (g) performing a phase rotation on the first clock by an amount controlled by the fourth control word to generate the third clock. In a further embodiment, step (d) comprises selecting a phase among a plurality of phases of the first clock in accordance with the first control word. In a further embodiment, step (g) comprises selecting a phase among a plurality of phases of the first clock in accordance with the first control word.

DETAILED DESCRIPTION OF PREFERRED EMBODIMENTS

The following detailed description refers to the accompanying drawings which show, by way of illustration, various embodiments in which the invention may be practiced. These embodiments are described in sufficient detail to enable those skilled in the art to practice these and other embodiments. The various embodiments are not necessarily mutually exclusive, as some embodiments can be combined with one or more other embodiments to form new embodiments. The following detailed description is, therefore, not to be taken in a limiting sense.

Figure 1:
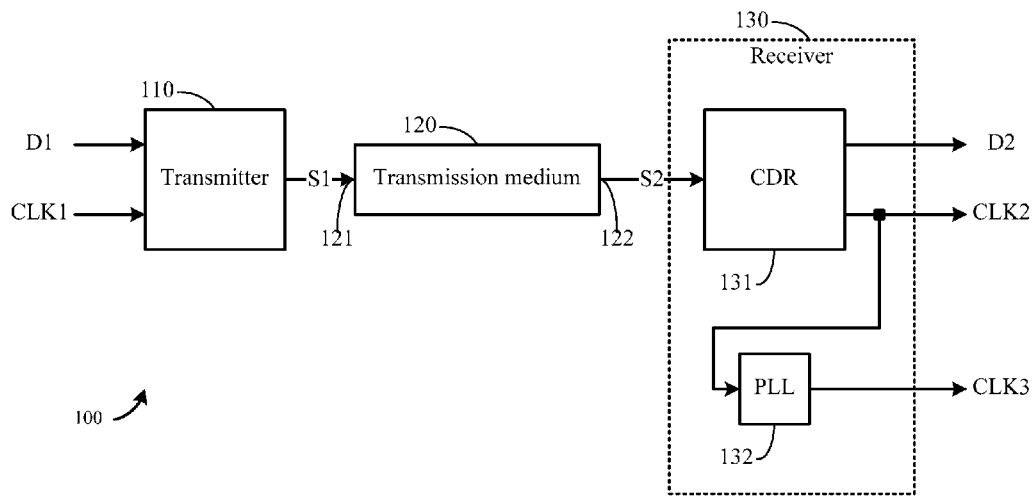
FIG. 1 shows a functional block diagram of a serial link.
Figure 2:
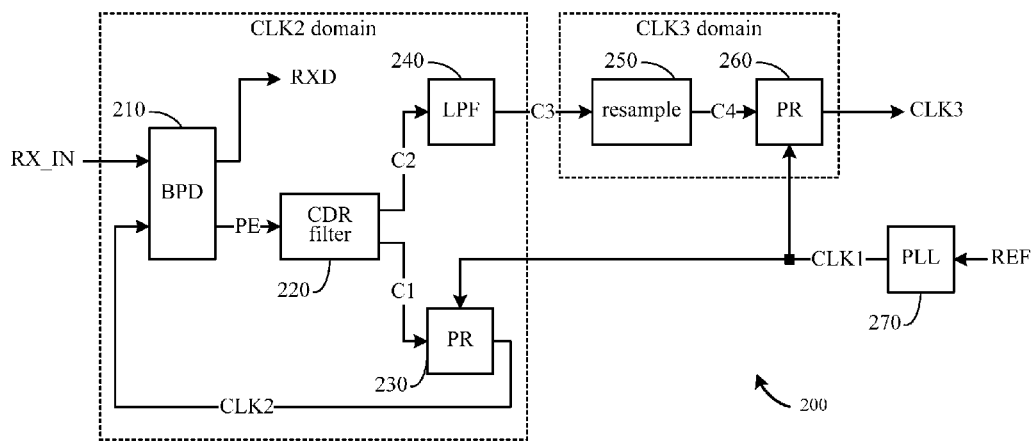
FIG. 2 shows a functional block diagram of a serial link receiver in accordance with an embodiment of the present invention.

FIG. 2 shows a functional block diagram of a serial link receiver 200 in accordance with an embodiment of the present invention. Receiver 200 comprises: a PLL (phase lock loop) 270 for receiving a reference clock REF and outputting a first clock CLK1; a BPD (binary phase detector) 210 for receiving an input signal RX_IN and a second clock CLK2 and outputting a recovered data RXD and a phase error signal PE; a digital CDR (clock-data recovery) filter 220 for filtering the phase error signal PE to generate a first control word C1 and a second control word C2; a first PR (phase rotator) 230 for performing a phase rotation on the first clock CLK1 to generate a second clock CLK2 in accordance with a phase rotation amount controlled by the first control word C1; a digital LPF (low pass filter) 240 for filtering the second control word C2 to generate a third control word C3; a resample circuit 250 for sampling the third control code C3 in accordance with a third clock CLK3 to generate a fourth control word C4; and a second PR (phase rotator) 260 for performing a phase rotation on the first clock CLK1 to generate the third clock CLK3 in accordance with a phase rotation amount controlled by the fourth control word C4. Except for PLL 270, receiver 200 comprises digital circuits of two clock domains: BPD 210, CDR filter 220, the first phase rotator PR 230, and low pass filter LPF 240 are in the CLK2 clock domain, while resample circuit 250, the second phase rotator PR 260 are in the CLK3 clock domain. A primary function and operation of receiver 200 is explained below.

Receiver 200 performs a CDR (clock-data recovery) function. The first clock CLK1 is locally generated using PLL 270 and phase locked to the reference clock REF, which is usually generated by a local crystal oscillator. Since the first clock CLK1 is phase locked to a local reference clock, a timing of the first clock CLK1 may be very different from a timing embedded in the input signal RX_IN, therefore a phase rotation (i.e., a phase shift) on the first clock CLK1 is needed to track the timing embedded in the input signal RX_IN. The first phase rotation PR 230 rotates the first clock CLK1 to generate the second clock CLK2 in accordance with a phase rotation amount controlled by the first control word C1, so that a timing of the second clock CLK2 may track the timing of the input signal RX_IN. Binary phase detector BPD 210 samples the input signal RX_IN to generate the recovered data RXD, and also performs a phase detection by exploring a timing relation between the second clock CLK2 and the timing embedded in the input signal RX_IN to generate the phase error signal PE.

In certain embodiments, the phase error signal PE is a ternary signal of three possible values: 1, 0, and −1. It is a value of 1 when the timing of the second clock CLK2 is too early (compared to the timing embedded in the input signal RX_IN). It is a value of −1 when the timing of the second clock CLK2 is too late (compared to the timing embedded in the input signal RX_IN). Finally, it is a value of 0 when the timing relation is uncertain. CDR filter 220 filters the phase error signal PE to generate the first control word C1 to control the amount of the phase rotation for first phase rotator PR 230, and thus control the timing of the second clock CLK2. In certain embodiments, when BPD 210 determines that the timing of the second clock CLK2 is too early (late), the phase error signal PE is set to 1 (−1). This leads to an increase (or decrease) in the first control word C1 through CDR filter 220, and causes the first phase rotator PR 230 to rotate more on the first clock CLK1 to delay (advance) the timing of the second clock CLK2. The timing of the second clock CLK2, therefore, is adjusted in a negative feedback closed-loop manner to track the timing embedded in the input signal RX_IN.

Although the combination of binary phase detector BPD 210, CDR filter 220, and the first phase rotator PR 230 forms a negative feedback control loop that may effectively perform a clock-data recovery function, the recovered clock CLK2 is subject to jitters due to noises that are inevitable in the negative feedback control loop. In particular, the first control word C1 may be noisy. Although one may choose to use a narrower bandwidth of CDR filter 220 to make the first control word C1 less noisy, this will impede the ability of the control loop to track a timing change in the input signal RX_IN and thus is usually not a viable solution. To maintain the ability of the control loop to track the timing change in the input signal RX_IN, the bandwidth of CDR filter 220 must be wide enough and therefore its ability to filter noise is limited, as a result the first control word C1 may contain excessive noise. To resolve this problem, CDR filter 220 outputs a second control word C2 that is subsequently filtered by the low pass filter LPF 240, resulting in the third control word C3. In an embodiment, the second control word C2 is exactly the same as the first control word C1. In an alternative embodiment, the second control word C2 is a less noisy version of the first control word C1 due to an arrangement in CDR filter 220. Because of the low pass filtering, the third control word C3 is less noisy (than both the first control word C1 and the second control word C2) and thus more suitable for generating a low jitter clock. The third clock CLK3, which is a low jitter clock, is generated by the second phase rotator PR 260 based on using the third control word C3, which is a less noisy control word. However, since the third control word C3 is in the domain of the second clock CLK2, which may not be a very clean clock, it may not work well to directly use C3 to control the second phase rotator PR 260. Therefore, resample circuit 250 is used to sample C3 using the third clock CLK3, which is less noisy than the second clock CLK2, resulting in the fourth control word C4. The fourth control word C4 is then used to control an amount of phase rotation on the first clock CLK1 by the second phase rotator PR 260 to generate the third clock CLK3.

Figures 3, 4:
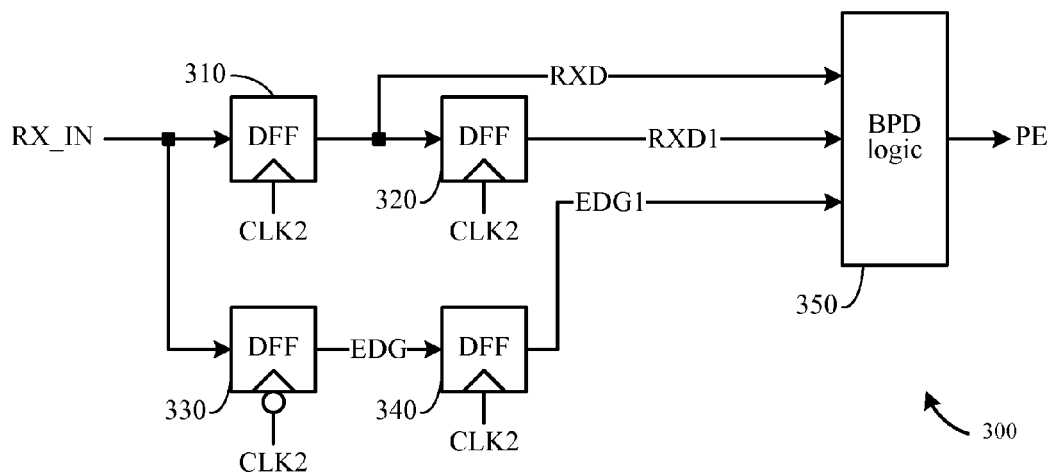
FIG. 3 shows a schematic diagram of a binary phase detector suitable for the serial link receiver of FIG. 2.
FIG. 4 shows an algorithm of a BPD (binary phase detection) logic suitable for the binary phase detector of FIG. 3.

FIG. 3 depicts a schematic diagram of a binary phase detector 300 that is an exemplary embodiment of BPD 210 of FIG. 2. Binary phase detector 300 comprises: a first DFF (D-type flip flop) 310 for sampling the input signal RX_IN using CLK2 to generate the recovered data RXD; a second DFF 320 for sampling the recovered data RXD using CLK2 to generate a unit-delay of the recovered data RXD1; a third DFF 330 for sampling the input signal RX_IN using an inversion of CLK2 to generate an edge data EDG; a fourth DFF 340 for sampling EDG using CLK2 to generate an synchronized edge data EDG1; and a BPD logic block to generate the phase error signal PE using RXD, RXD1, and EDG1 in accordance an algorithm described in the C-language statements shown in FIG. 4. Persons skilled in the art will appreciate the structure and operation of binary phase detectors, and therefore the BPD need not be described herein.

In certain embodiments, CDR filter 220 implements the following functions: the second control word C2 is an integration of the phase error signal PE times a first gain factor $K_I$, while the first control word C1 is the phase error signal PE times a second gain factor $K_p$ plus the second control word C2. In z-transform representation, that is:

$$C2 = K_I \cdot PE/(1-z^{-1})$$

$$C1 = C2 + K_P \cdot PE$$

Figure 5:
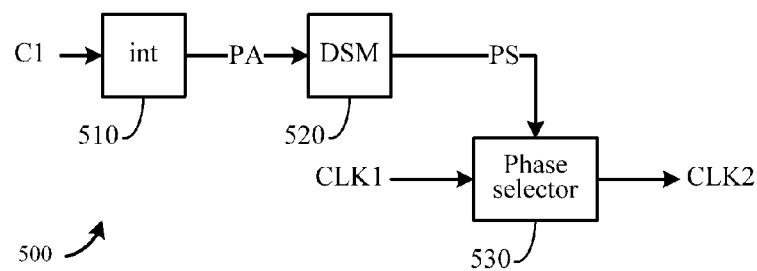
FIG. 5 shows a functional block diagram of a phase rotator suitable for the serial link receiver of FIG. 2.
Figure 6:
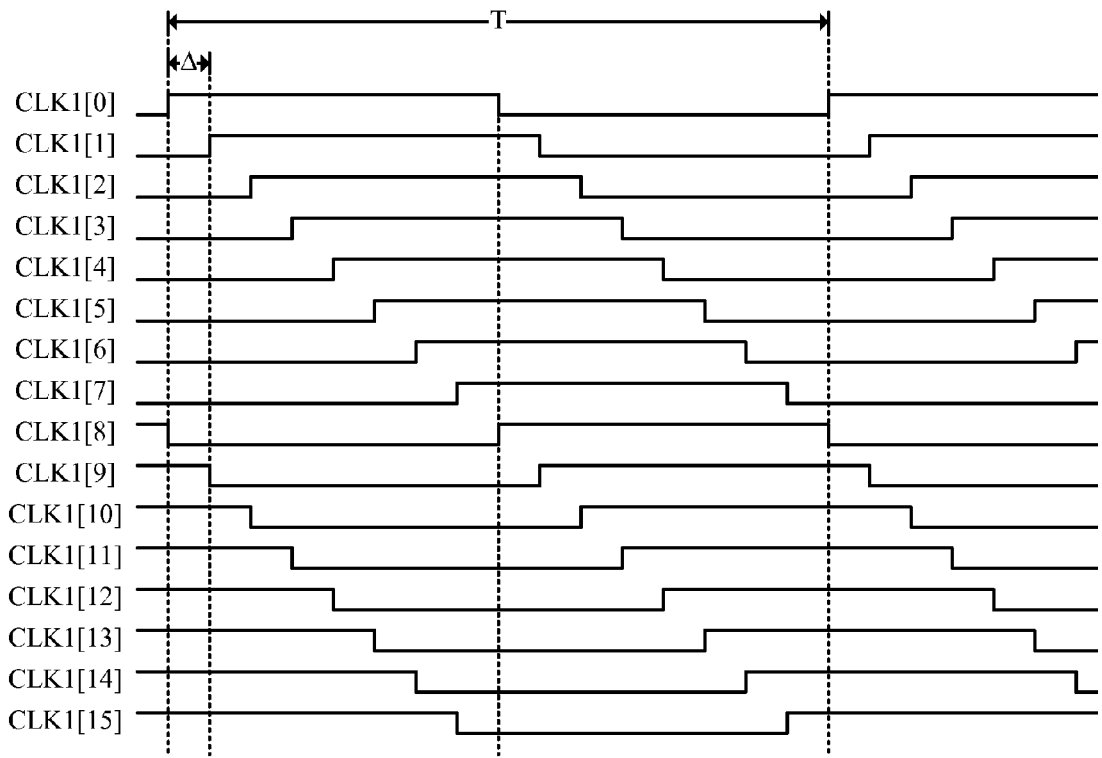
FIG. 6 shows a timing diagram of a 16-phase clocking scheme for the first clock CLK1 of the serial link receiver of FIG. 2.

FIG. 5 shows a functional block diagram of an exemplary phase rotator 500 suitable for implementing the first phase rotator PR 230 of FIG. 2. In the illustrated embodiment, phase rotator 500 comprises: an integrator for integrating the first control word C1 into a fine phase word PA; a delta sigma modulator (DSM) 520 for reducing a word length of the fine phase word PA into a coarse phase word PS; and a phase selector 530 for selecting a clock phase of the first clock CLK1 to generate the second clock CLK2 in accordance with the coarse phase word PS. By way of example, but not limitation, a 16-phase clocking scheme for the first clock CLK1 is used, and an exemplary timing diagram is shown in FIG. 6. Here, CLK1 comprises sixteen phases, denoted from CLK1 [0] to CLK1 [15], that are uniformly spaced in time with a spacing Δ=T/16 between adjacent phases, where T is a period of CLK1. When using a 16-phase clocking scheme, the coarse phase word PS is a four-bit word of values between 0 and 15. In an embodiment, phase selector 530 is a multiplexer for selecting one out of the sixteen phases of CLK1 to generate CLK2. For instance, when PS is 4, CLK1 [4] is selected; when PS is 12, CLK1 [12] is selected; and so on. In one embodiment, PLL 270 comprises a 16-phase ring oscillator and the 16-phase CLK1 clock is directly generated by PLL 270. The principle of using multi-phase ring oscillator to generate a multi-phase clock using a PLL will be appreciated by persons skilled in the art and thus not described in detail here.

In an alternative embodiment, PLL 270 generates 8-phase clock with a spacing of T/8 between adjacent phases, and a phase interpolator circuit is used to generate the other 8 phases that are missing. A suitable phase interpolator circuit will be understood by persons skilled in the art and thus not described in detail here. In alternative embodiments, more phases (e.g., 32-phase or 64-phase) may be implemented, which can be either directly generated from PLL using ring oscillator of more phases or interpolated from coarse phases, to increase a number of phases for the first clock CLK1 and thus improve the resolution of phase rotation for the first phase rotator 230 to achieve a cleaner clock for the second clock CLK2 at the cost of more expensive hardware.

Reference is now made to FIG. 2. LPF 240 is a digital low pass filter that can be either an IIR (infinite impulse response) or a FIR (finite impulse response) filter. Implementation of digital low pass filters is well known in prior art and thus not described in detail here.

Resample circuit 250 is a synchronization circuit that converts a CLK2 domain word C3 into a CLK3 domain word C4. Synchronization circuits of this type are well known in prior art and thus not described in detail here.

In an embodiment, the second phase rotator PR 260 is embodied in circuits that function equivalently to the first phase rotator 230 as described above. However, it may use a different resolution for phase rotation (e.g., using more phases for the first clock CLK1).

Please note that the above descriptions for functional blocks of BPD 210, CDR filter 220, LPF 240, PR 230, and PR 260 are all meant to illustrate their respective functions, and there may be numerous alternative embodiments or variations that can also fulfill the desired functions. For instance, if the data rate for the input signal RX_IN is 100 Mb/s and the recovered clock (CLK2 or CLK3) is 100 MHz, then all these blocks may operate at 100 MHz in accordance with the embodiments described above. Using modern semiconductor technologies, it is easy to implement logical circuits operating at 100 MHz. However, if the data rate for the input signal RX_IN is 1 Gb/s and the recovered clock (CLK2 or CLK3) is 1 GHz, it is difficult to implement logical circuits operating at 1 GHz to fulfill the desired functions described above. In this case, as well known in prior art when a clock speed is too high for a logical circuit, one may choose to use block processing to reduced the requirement on the speed of the logical circuits.

For instance, a 10-bit block processing can be used to reduce the required speed of the logical circuits from 1 GHz to 100 MHz. In block processing, the input signal RX_IN is sampled in serial at high speed (e.g., 1 GHz) to generate RXD and EDG (see FIG. 3), which after a serial-to-parallel conversion are converted into two respectively block data at low speed (e.g. each is 10-bit block data at 100 MHz). The block data are then processed at the low speed of 100 MHz, as opposed to the high speed of 1 GHz if not using block processing. Using block processing, the receiver functions are equivalent to those in direct high speed serial processing, except for latency due to using the serial-to-parallel conversion and low speed block processing. It is up to designer to determine if the latency is acceptable and if the block processing scheme is viable.

Although specific embodiments have been illustrated and described herein, it will be appreciated by those of ordinary skill in the art that a variety of arrangements, which are appropriate to achieve the same purpose, may be substituted for the specific embodiments shown, consistent with the scope and spirit of the present invention. Also, various components of the inventive embodiments are of structure and operation that will be appreciated by persons skilled in the art, and therefore need not be described in detail herein. The combination of these component parts, however, is novel and non-obvious over collective assemblies of the prior art.

This application is intended to cover adaptations and variations of the embodiments discussed herein. Various embodiments use permutations and/or combinations of embodiments described herein. It is to be understood that the above description is intended to be illustrative, and not restrictive, and that the phraseology or terminology employed herein is for the purpose of description.

What is claimed is:

1. An apparatus comprising:
a clock generator for outputting a first clock;
a binary phase detector for receiving an input signal and a second clock and outputting a phase error signal by detecting a timing difference between the input signal and the second clock;
a first filter for receiving the phase error signal and outputting a first control word and a second control word by filtering the phase error signal;
a first phase rotator for generating the second clock by performing a phase rotation on the first clock by an amount controlled by the first control word;
a second filter for receiving the second control word and outputting a third control word by low pass filtering the second control word;
a resample circuit for sampling the third control word and outputting a fourth control word using a third clock; and
a second phase rotator for generating the third clock by performing a phase rotation on the first clock by an amount controlled by the fourth control word.

2. The apparatus of claim 1, wherein the phase error signal is a ternary signal.

3. The apparatus of claim 1, wherein the first filter comprises an integrator.

4. The apparatus of claim 1, wherein the first clock is a multi-phase clock.

5. The apparatus of claim 4, wherein the first phase rotator outputs the second clock by selecting a phase among a plurality of phases of the first clock in accordance with the first control word.

6. The apparatus of claim 5, wherein the first phase rotator further comprises a phase interpolator to increase a number of phases of the first clock for selection.

7. The apparatus of claim 4, wherein the second phase rotator outputs the third clock by selecting a phase among a plurality of phases of the first clock in accordance with the fourth control word.

8. The apparatus of claim 7, wherein the second phase rotator further comprises a phase interpolator to increase a number of phases of the first clock for selection.

9. The apparatus of claim 1, wherein the binary phase detector, the first filter, the second filter, and the first phase rotator operates in accordance with the second clock.

10. The apparatus of claim 1, wherein the resample circuit and the second phase rotator operates in accordance with the third clock.

11. A method comprising:
generating a first clock;
generating a phase error signal by detecting a timing difference between an input signal and a second clock;
filtering the phase error signal to generate a first control word and a second control word;
performing a phase rotation on the first clock by an amount controlled by the first control word to generate the second clock;
filtering the second control word to generate a third control word;
sampling the third control word to generate a fourth control word using a third clock; and
performing a phase rotation on the first clock by an amount controlled by the fourth control word to generate the third clock.

12. The method of claim 11, wherein the phase error signal is a ternary signal.

13. The method of claim 11, wherein filtering the phase error signal comprises using an integrator.

14. The method of claim 11, wherein the first clock is a multi-phase clock.

15. The method of claim 14, further comprising selecting a phase among a plurality of phases of the first clock.

16. The method of claim 15 further comprising using a phase interpolator to increase a number of phases of the first clock for selection.

17. The method of claim 11, further comprising using logical circuits operating in accordance with the second clock.

* * * * *